(No Model.)
E. GOSS.
PULLEY.
No. 432,667. Patented July 22, 1890.
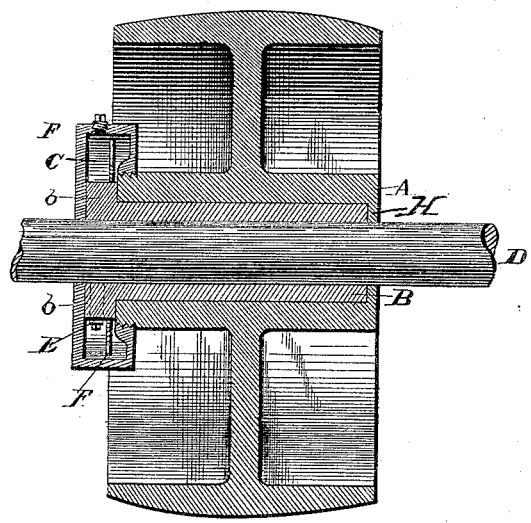

UNITED STATES PATENT OFFICE.

EDWARD GOSS, OF HARTFORD, VERMONT.

PULLEY.

SPECIFICATION forming part of Letters Patent No. 432,667, dated July 22, 1890.

Application filed August 30, 1889. Serial No. 322,471. (No model.)

*To all whom it may concern:*

Be it known that I, EDWARD GOSS, a citizen of the United States, residing at Hartford, in the county of Windsor, State of Vermont, have invented certain new and useful Improvements in Pulleys, of which the following is so full, clear, and exact a description as will enable others skilled in the art to which my invention appertains to make and use the same.

This invention has relation to loose pulleys; and it consists in certain novel features in the construction thereof, substantially as hereinafter described and claimed.

The accompanying figure of drawing illustrates my invention in section.

A designates the hub of a pulley, D the shaft, and B a bushing surrounding said shaft. On this bushing the pulley revolves. A bolt E connects this bushing with the shaft D and prevents it revolving with the pulley. This bushing B is constructed with an enlargement or head b, the inner surface of which is in close contact with the outer surface of the hub of the pulley and the opposite end of said bushing is in contact with the inner surface of an annular flange H, which projects inwardly from the hub of the pulley, of which it is a part. This flange H is perforated for the passage of the shaft D.

I have shown in connection with my improved pulley a reservoir C, which is secured to the hub of the pulley and incloses the head b of the bushing, which reservoir is claimed in my other pending application, Serial No. 295,732, filed January 8, 1889. This reservoir C serves to automatically supply the bushing B with the lubricant; but to its use I do not wish to be understood as limiting myself, as my invention relates entirely to the construction of the pulley *per se*. When this reservoir is used, I employ in connection therewith two pins F F, which are fastened in the head of the bushing and project from opposite sides thereof into the oil-reservoir. In the operation of the device one of these pins will always be on a level with or above the oil, and they are designed to catch the oil and convey it to the bushing.

Having now described my invention, what I believe to be new, and desire to secure by Letters Patent, and what I therefore claim, is—

1. A pulley and a shaft, in combination with a bushing surrounding the shaft and revolving therewith, said bushing having an enlargement at one end, the inner portion of which enlargement abuts against the end of the hub, substantially as shown and described.

2. A pulley the hub of which is formed at its end with an inwardly-extending perforated flange, and a shaft passing through said flange and hub, in combination with a bushing surrounding said shaft and secured thereto, one end of said bushing being inclosed by and in contact with the inner surface of said annular flange and its opposite end enlarged and the inner portion of the enlargement abutting against the end of the hub, all substantially as shown, and for the purposes set forth.

In testimony whereof I affix my signature in the presence of two witnesses.

EDWARD GOSS.

Witnesses:
A. R. BROOK,
JAMES G. HARVEY.